(12) United States Patent
Yamashita et al.

(10) Patent No.: US 10,912,994 B2
(45) Date of Patent: Feb. 9, 2021

(54) VIBRATION CONTROL SYSTEM, VIBRATION CONTROL APPARATUS AND VIBRATION CONTROL METHOD

(71) Applicant: NINTENDO CO., LTD., Kyoto (JP)

(72) Inventors: Kei Yamashita, Kyoto (JP); Takafumi Aoki, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 184 days.

(21) Appl. No.: 15/862,726

(22) Filed: Jan. 5, 2018

(65) Prior Publication Data

US 2018/0193738 A1    Jul. 12, 2018

(30) Foreign Application Priority Data

Jan. 12, 2017   (JP) .................................. 2017-003034

(51) Int. Cl.
*A63F 13/285*     (2014.01)
*A63F 13/235*     (2014.01)
(Continued)

(52) U.S. Cl.
CPC .......... *A63F 13/285* (2014.09); *A63F 13/235* (2014.09); *A63F 13/28* (2014.09);
(Continued)

(58) Field of Classification Search
CPC ...... A63F 13/285; A63F 13/537; A63F 13/54; A63F 13/28; A63F 13/98; A63F 13/235;
(Continued)

(56) References Cited

U.S. PATENT DOCUMENTS 6,599,196 B2 *   7/2003   Kikukawa ............... G06F 3/016
                                                          463/43
7,052,397 B2 *   5/2006   Kikukawa ............... G06F 3/016
                                                          463/43
(Continued)

FOREIGN PATENT DOCUMENTS

JP      10-136064 A      5/1998
JP      10-295932 A     11/1998
(Continued)

OTHER PUBLICATIONS

Extended European Search Report dated May 7, 2018 issued in European Application No. 18150287.3 (7 pgs.).
(Continued)

*Primary Examiner* — Nimeshkumar D Patel
*Assistant Examiner* — Tania Courson
(74) *Attorney, Agent, or Firm* — Nixon & Vanderhye P.C.

(57) ABSTRACT

A non-limiting example game apparatus functions as a vibration control apparatus. When vibration data are simultaneously input from a plurality of programs during execution of the plurality of programs, the game apparatus drives a vibration motor incorporated in the game apparatus by preferentially using the vibration data from the program that is granted with a vibration control right. The vibration control right is authority of performing vibration control preferentially, and is basically granted to a program corresponding to an image being displayed forefront; however, when a plurality of images are displayed, the vibration control right is granted to a program having authority of acquiring an input from an input device (controller).

16 Claims, 13 Drawing Sheets

(51) Int. Cl.
  *A63F 13/98* (2014.01)
  *A63F 13/28* (2014.01)
  *A63F 13/54* (2014.01)
  *A63F 13/537* (2014.01)
  *A63F 13/00* (2014.01)
  *A63F 13/20* (2014.01)

(52) U.S. Cl.
  CPC ............ *A63F 13/537* (2014.09); *A63F 13/54* (2014.09); *A63F 13/98* (2014.09); *A63F 13/00* (2013.01); *A63F 13/20* (2014.09); *A63F 2300/1037* (2013.01); *A63F 2300/1075* (2013.01); *A63F 2300/301* (2013.01); *A63F 2300/638* (2013.01)

(58) Field of Classification Search
  CPC ........ A63F 2300/1037; A63F 2300/301; A63F 2300/1075; A63F 2300/638
  See application file for complete search history.

(56) References Cited

U.S. PATENT DOCUMENTS

| | | | | |
|---|---|---|---|---|
| 7,351,152 | B2* | 4/2008 | Abe | A63F 13/10 463/43 |
| 8,043,161 | B2* | 10/2011 | Nogami | A63F 13/12 463/43 |
| 8,688,042 | B2* | 4/2014 | Fujiwara | H04L 12/1822 455/41.2 |
| 9,244,562 | B1* | 1/2016 | Rosenberg | G06F 3/04847 |
| 9,542,820 | B2* | 1/2017 | Moussette | G08B 6/00 |
| 10,114,623 | B2* | 10/2018 | Oda | G06F 8/40 |
| 10,213,683 | B2* | 2/2019 | Oizumi | A63F 13/24 |
| 10,328,345 | B2* | 6/2019 | Aoki | A63F 13/235 |
| 10,417,879 | B2* | 9/2019 | Moussette | G06F 3/0488 |
| 10,556,176 | B2* | 2/2020 | Aoki | A63F 13/23 |
| 10,632,371 | B2* | 4/2020 | Kyuma | A63F 13/23 |
| 2001/0003708 | A1* | 6/2001 | Aizu | A63F 13/5255 463/7 |
| 2006/0046843 | A1 | 3/2006 | Nakajima | |
| 2008/0248816 | A1 | 10/2008 | Hatano et al. | |
| 2009/0325647 | A1 | 12/2009 | Cho et al. | |
| 2010/0022303 | A1 | 1/2010 | Nakajima | |
| 2010/0141606 | A1* | 6/2010 | Bae | G06F 3/016 345/174 |
| 2011/0018695 | A1* | 1/2011 | Bells | G06F 3/016 340/407.2 |
| 2011/0159958 | A1* | 6/2011 | Miura | A63F 13/211 463/36 |
| 2013/0244783 | A1 | 9/2013 | Nakajima | |
| 2013/0281212 | A1 | 10/2013 | Tsuchiya et al. | |
| 2014/0347298 | A1 | 11/2014 | Park et al. | |
| 2016/0063825 | A1 | 3/2016 | Moussette et al. | |
| 2016/0193502 | A1* | 7/2016 | Kim | G06F 3/167 715/728 |
| 2017/0010677 | A1* | 1/2017 | Roh | G06F 3/0488 |
| 2017/0106275 | A1 | 4/2017 | Tsuchiya et al. | |
| 2018/0178119 | A1* | 6/2018 | Mizuta | A63F 13/211 |
| 2018/0341235 | A1* | 11/2018 | Oda | G05B 15/02 |

FOREIGN PATENT DOCUMENTS

| | | |
|---|---|---|
| JP | 2004-72199 A | 3/2004 |
| JP | 2006-068210 | 3/2006 |
| JP | 2006-135841 A | 5/2006 |
| JP | 2007-173920 | 7/2007 |
| JP | 2013-236909 | 11/2013 |
| WO | 2006/022076 A1 | 3/2006 |

OTHER PUBLICATIONS

Japanese-language Office Action issued in Japanese Application No. 2017-003034 dated Nov. 17, 2020 with English translation (6 pages).
[iOS7] How to set ringtone & vibration of incoming email and message separately, Let's enjoy iPhone life! SBAPP [online], Mar. 9, 2014, three pages https://sbapp.net/appnews/app/upinfo/baibu-6699.

* cited by examiner

VIBRATION CONTROL SYSTEM, VIBRATION CONTROL APPARATUS AND VIBRATION CONTROL METHOD

CROSS REFERENCE OF RELATED APPLICATION

The disclosure of Japanese patent application No. 2017-3034 filed on Jan. 12, 2017 is incorporated by reference.

FIELD

This application explains a vibration control system, vibration control apparatus and vibration control method, controlling vibration of a device provided with a vibration motor.

SUMMARY

It is a primary object of an embodiment(s) to provide a novel vibration control system, vibration control apparatus and vibration control method.

Moreover, it is another object of the embodiment(s) to provide a vibration control system, vibration control apparatus and vibration control method, capable of appropriately presenting vibration even when being requested simultaneously from a plurality of programs.

A first embodiment is a vibration control system, comprising: a first vibration reception portion, a second vibration reception portion, and a vibration control portion. The first vibration reception portion is configured to receive first vibration data that first software generates. The second vibration reception portion is configured to receive second vibration data that second software generates. The vibration control portion is configured to make, when the second vibration reception portion receives the second vibration data at the same time that the first vibration reception portion receives the first vibration data, a predetermined apparatus or a predetermined terminal connected to the predetermined apparatus vibrate by using either one of the first vibration data and the second vibration data.

According to the first embodiment, since the predetermined apparatus or the predetermined terminal connected to the predetermined apparatus is made to vibrate by using either one of the first vibration data and the second vibration data when the vibration data are simultaneously received from two pieces of software, it is possible to appropriately present the vibration to the user that holds the predetermined apparatus or the predetermined terminal.

A second embodiment is the vibration control system according to the first embodiment, further comprising a priority setting portion. The priority setting portion is configured to set a priority for indicating a priority level of vibration control for the first software and the second software according to a status of the software, for example. The vibration control portion is configured to use either one of the first vibration data and the second vibration data according to the priority that is set by the priority setting portion.

According to the second embodiment, since the priority for the vibration control is set for the first software and second software, it is possible to appropriately determine according to the priority the vibration data to be used. As a result, the vibration can be appropriately presented.

A third embodiment is the vibration control system according to the second embodiment, wherein the first software further generates first sound data and the second software further generates second sound data. Moreover, the vibration control system further comprises a sound volume balance setting portion, a first sound reception portion, a second sound reception portion and a sound control portion. The sound volume balance setting portion is configured to set a sound volume balance in sound control for the first software and the second software. The first sound reception portion is configured to receive the first sound data. The second sound reception portion is configured to receive the second sound data. The sound control portion is configured to output, when the second sound reception portion receives the second sound data at the same time that the first sound reception portion receives the first sound data, at least one of the first sound data and the second sound data while changing an amplitude thereof according to the sound volume balance that is set by the sound volume balance setting portion. That is, as for the sound data, the sound volume is controlled. For example, the sound volume of the software having authority (acquisition right) to acquire input information from input portion such as an input device or controller is set so as to be larger than the sound volume of the software having no acquisition right.

According to the third embodiment, since amplitudes of the sound data that are generated from a plurality of pieces of software are controlled according to the set sound volume balance, sound that is to be output in conjunction with the vibration control can be appropriately controlled.

A fourth embodiment is the vibration control system according to the first embodiment, wherein the first software is concurrently executed with the second software.

A fifth embodiment is the vibration control system according to the first embodiment, wherein either one of the first software and the second software is a game program.

A sixth embodiment is a vibration control apparatus, comprising: a first vibration reception portion configured to receive first vibration data that first software generates; a second vibration reception portion configured to receive second vibration data that second software generates; and a vibration control portion configured to make, when the second vibration reception portion receives the second vibration data at the same time that the first vibration reception portion receives the first vibration data, a predetermined apparatus or a predetermined terminal connected to the predetermined apparatus vibrate by using either one of the first vibration data and the second vibration data.

A seventh embodiment is a vibration control method, comprising steps of: (a) receiving first vibration data that first software generates; (b) receiving second vibration data that second software generates; and (c) making, when the second vibration data is received in the step (b) at the same time that the first vibration data is received in the step (a), a predetermined apparatus or a predetermined terminal connected to the predetermined apparatus vibrate by using either one of the first vibration data and the second vibration data.

According to the sixth and seventh embodiments, as similar to the first embodiment, it is possible to appropriately present vibration.

The above described objects and other objects, features, aspects and advantages of the embodiment(s) will become more apparent from the following detailed description when taken in conjunction with the accompanying drawings.

DETAILED DESCRIPTION OF NON-LIMITING EXAMPLE EMBODIMENTS

First Embodiment

Figure 1:
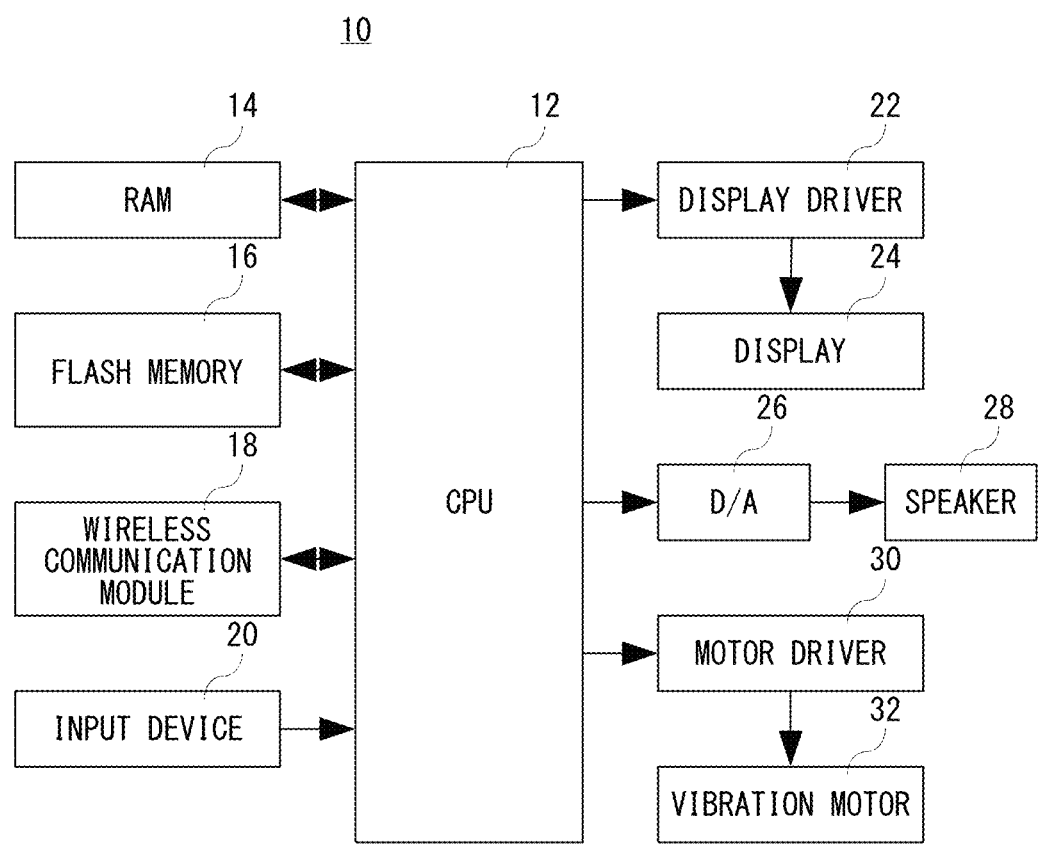
FIG. 1 is a block diagram showing a non-limiting example electric configuration of a game apparatus.

With reference to FIG. 1, a non-limiting example game apparatus 10 is a predetermined apparatus such as a portable game apparatus, and includes a CPU 12. The CPU 12 is connected with a RAM 14, a flash memory 16, a wireless communication module 18, an input device 20, a display driver 22, a digital to analog (D/A) converter 26 and a motor driver 30. Moreover, a display device 24 is connected to the display driver 22, and a speaker 28 is connected to the D/A converter 26. Furthermore, a vibration motor (vibrator) 32 is connected to the motor driver 30.

In addition, a case where the portable game apparatus 10 is used as an example of an information processing apparatus or information processing terminal will be described in this specification, but a smartphone, a tablet terminal, etc. can be used.

Moreover, in the portable game apparatus 10, a configuration that the input device 20 (controller) is attachable to or detachable from a main body apparatus may be adopted. In such a case, when the input device 20 is in a state detached from the main body apparatus, the main body apparatus performs wireless communication with the input device 20. On the other hand, when the input device 20 is in a state attached to the main body apparatus, the main body apparatus performs wire-communication with the input device 20. Moreover, the motor driver 30 and the vibration motor 32 are provided in an interior of the input device 20.

Furthermore, it is possible to use not only a portable apparatus or terminal but a stationary game apparatus, personal computer having a game function, etc. In this case, similar to the case where the input device 20 is in a state detached from the main body apparatus of the game device 10, the input device 20 (controller) is connected to the main body apparatus of the game device 10 wire-communicably or wireless-communicably, and input device 20 is provided with the motor driver 30 and the vibration motor 32. Similarly, the motor driver 30 and the vibration motor 32 may be provided in an input means connected to personal computer wire-communicably or wireless-communicably.

The CPU 12 is in charge of overall control of the game apparatus 10. The RAM 14 is a volatile storage device, and is used as a working area and a buffer area of the CPU 12. The flash memory 16 is a nonvolatile storage device, and stores various software (programs) that are executable by the game apparatus 10, save data, etc.

However, the software is system software (system program) and application software (application program). For example, the system program is software that performs management, control, etc. of hardware of a computer, and corresponds to a program related to main body functions such as an operating system, a device driver, etc. As the main body function, control of sound volume, control of screen brightness, turn-on/off of a wireless communication function, etc. correspond. Moreover, the application program (information processing program) is software to be used for specific purposes such as game, content reproduction, browser, character practice, language exercise, direction guide, dictionary, drawing, email, word processor, spreadsheet, etc. In the following, when there is no necessity of distinguishing a system program and an application program, a term "program" is simply used.

The wireless communication module 18 has a function to access a wireless LAN according to the standard of IEEE802. 11. b/g, for example. Therefore, the CPU 12 transmits or receives data to or from other equipment (computers, other game apparatuses 10, etc.) via an access point and Internet (network) with using the wireless communication module 18. However, it is also possible to transmit or receive data to or from other equipment directly.

Otherwise, the wireless communication module 18 has a function to perform short-distance wireless communication. Specifically, the wireless communication module 18 has a function to transmit or receive an infrared signal to or from other equipment (other game apparatuses etc.) with a predetermined communication system (infrared system, for example), and a function to perform wireless communication with the same or similar kind of game apparatus according to a predetermined communication protocol (multilink protocol, for example). Therefore, the CPU 12 can transmit or receive data to or from the same or similar kind of other game apparatuses directly with using the wireless communication module 18. However, instead of the short-distance wireless communication of an infrared system, short-distance wireless communication according to other wireless-communication standards such as Bluetooth (registered trademark) may be performed.

The input device 20 includes various kinds of operation buttons, keys or switches. Moreover, a joy stick or/and a slide pad may be included in the input device 20. Furthermore, when the game apparatus 10 comprises a touch panel, this touch panel also functions as a part of the input devices 20. For example, the touch panel is provided on the display device 24. However, a touch display that a touch panel is integrally formed with the display device 24 may be used.

The display driver 22 includes a GPU and a video RAM, and generates in the video RAM, under instructions of the CPU 12, image data for a game screen to be displayed on the display device 24, and outputs the image data to the display device 24. The D/A converter 26 converts sound data that is output from the CPU 12 into an analog sound signal, thereby to output to the speaker 28.

The motor driver 30 drives the vibration motor 32 according to instructions of the CPU 12. However, upon acquisition of the vibration data from the program being executed, the CPU 12 applies the acquired vibration data to the motor driver 30. The motor driver 30 generates a driving signal for driving the vibration motor 32 based on the vibration data applied from the CPU 12, and applies the generated driving signal to the vibration motor 32. Therefore, the vibration motor 32 operates according to the vibration data from the CPU 12. Accordingly, vibration that is generated by driving the vibration motor 32 is conveyed to a user or player (hereinafter, simply called "player") that holds the game apparatus 10.

For example, the vibration motor 32 is a linear motor that outputs (vibrates) with a pattern according to an input waveform (vibration waveform) of an analog signal (driving signal) such as a sound signal. However, in this first embodiment, the vibration data is data of a set of a value of a frequency and a voltage value of an amplitude both corresponding to a signal value of the analog signal (vibration signal) at each time point. By being applied with a voltage value indicated by the vibration data so as to increase or decrease at a frequency indicated by the vibration data in accordance with the signal value at each time point of the vibration signal, a position of an internal weight is varied, whereby the linear motor as the vibration motor 32 can output with the pattern according to the input waveform.

In addition, although the linear motor is used as the vibration motor 32 in this embodiment, there is no necessity of being limited to this, and a piezoelectric element or a voice coil can be used, for example.

Moreover, the vibration data is generated by the CPU 12 by executing a program that generates vibration data or by reading vibration data that is stored. Although the vibration data is data about a set of the value of a frequency and the voltage value of an amplitude both corresponding to the vibration waveform (waveform of the analog signal) in this first embodiment, the vibration data may be a signal of a vibration waveform itself, or data obtained by digitizing a vibration waveform. Moreover, the vibration data may be data of a set of values indicating a frequency and an amplitude, different from a set of the value of a frequency and the voltage value corresponding to an amplitude.

Moreover, the electric configuration of the game apparatus 10 shown in FIG. 1 is an example, and should not be limited. For example, an inertia sensor (an acceleration sensor or/and gyro sensor) for detecting a direction (attitude) or/and movement of the game apparatus 10 may be provided.

With such the game apparatus 10 having such a configuration, during execution of a program (program (1)) such a game program, another program (program (2)) such as an email program is concurrently executed, whereby an email can be received while playing the game. Moreover, it is possible to compose and transmit an email as necessary with interrupting the game or without interrupting the game. However, the program (1) (equivalent to first software) and the program (2) (equivalent to second software) are examples, and should not be limited.

Moreover, in this specification, as for programs stored in the game apparatus 10, each program is expressed in an identifiable manner using an alphabet (see FIG. 3), and among them, two programs that are started (executed) may be expressed as the program (1) and the program (2).

When the game apparatus 10 is executing an application program (program (1)) of a game, a game screen is displayed on the display device 24 and a sound (music) of the game is output from the speaker 28. Moreover, the vibration motor 32 is driven in response to occurrence of a predetermined event. Furthermore, the game apparatus 10 concurrently executes an application program (program (2)) of an email with a game program, and waits for reception of an email or input of an instruction to compose an email.

As described above, if receiving an email while the game is being played, an image (notification image) for notifying that an email is received is displayed on a part of a game screen. The notification image is superimposed (on the front side) on the game screen. Such a notification image is displayed on an upper edge etc. of a display plane of the display device 24 with a size smaller than the game screen so as not to disturb the game. At this time, the reception of an email may be notified by a sound or/and vibration not only by the notification image.

In a case where the reception of an email is notified with a sound (notification sound), it is considered that the player can distinguish a game sound and a notification sound from each other. However, in a case where reception of an email is notified with vibration, it is considered that it is difficult for the player to perceive whether vibration is generated due to the occurrence of an event in the game or vibration is generated due to the reception of an email.

Therefore, in this first embodiment, a program to be granted with authority of generating vibration and a program to be granted with authority of outputting sound are determined in accordance with a predetermined rule, so that the vibration is appropriately controlled in a case where vibration generation is requested by the program (1) and the program (2) simultaneously, and the sound is appropriately controlled in a case where sound output is requested by the program (1) and the program (2) simultaneously.

Figure 2A:
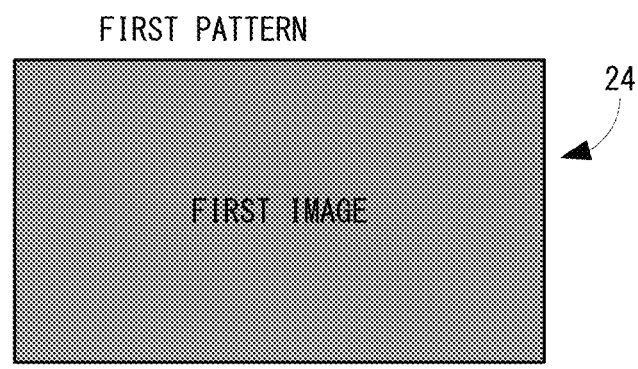
FIG. 2A is an illustration view showing a non-limiting example image to be displayed on a display device shown in FIG. 1.
Figure 2B:
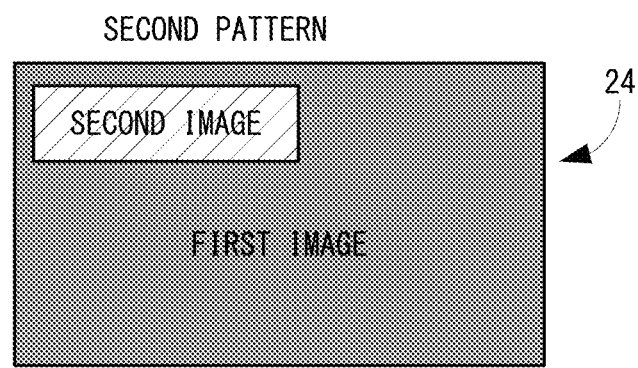
FIG. 2B is an illustration view showing another non-limiting example image to be displayed on the display device shown in FIG. 1.
Figure 2C:
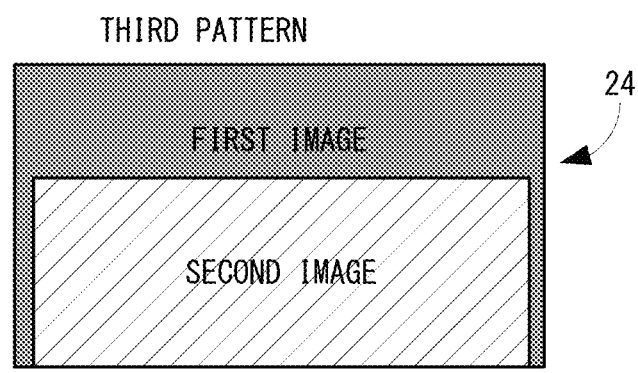
FIG. 2C is an illustration view showing a further non-limiting example image to be displayed on the display device shown in FIG. 1.
Figure 2D:
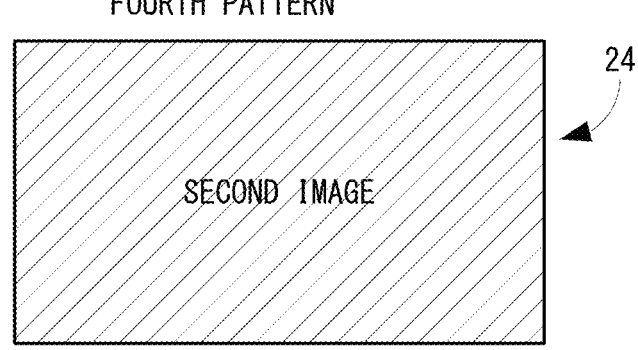
FIG. 2D is an illustration view showing a still further non-limiting example image to be displayed on the display device shown in FIG. 1.

FIG. 2A is an illustration view showing a non-limiting example state (first pattern) where a screen of the program (1) (first image) is displayed on the display device 24. FIG. 2B is an illustration view showing a non-limiting example state (second pattern) where a screen of the program (2) (second image) is displayed on a part of the first image that is displayed on the display device 24. FIG. 2C is an illustration view showing another non-limiting example state (third pattern) where the second image is displayed on a part of the first image that is displayed on the display device 24. FIG. 2D is an illustration view showing a non-limiting example state (fourth pattern) where the second image is displayed on the display device 24 while covering a whole of the first image. That is, in a case shown in FIG. 2D, the second image is displayed on the front of the first image.

In the first pattern, the program (1) is executed, and as shown in FIG. 2A, the first image related to the program (1) is displayed on the display device 24. For example, the first image is a game screen. In this case, the game is played according to an operation of the player so that the game screen is updated and the game sound is output from the speaker 28. Moreover, when an event occurs in the game, the vibration motor 32 is driven.

In the second pattern, the program (2) is concurrently executed with the program (1), and as shown in FIG. 2B, the second image related to the program (2) is displayed in an upper left portion of the first image. For example, the second image shown in FIG. 2B is the notification image of an email. Therefore, when the notification image is displayed on a part of the game screen, the notification sound is output from the speaker 28. At this time, the sound volume of the game sound may be reduced. As described above, since it is difficult to perceive the vibration due to the event in the game and the vibration for notifying the reception of email distinguishably, the vibration for notifying the reception of email is not generated. Moreover, the notification image is non-displayed a few or several seconds after the same is displayed. In this case, since the player does not operate with respect to the second image, the program (2) does not need to receive input information of the operation by the player.

In addition, although a case where it is not necessary for the program (2) to receive the input information is described in the above-described example, the program (2) may be made to receive the input information. For example, when the notification image is displayed on a part of the game screen and the notification sound is output from the speaker 28, the input information from the player may be temporarily received by the program (2) rather than the program (1). In this case, the operation for the game (program (1)) is not received until the player performs an input operation of a button depression etc. That is, the program (1) cannot acquire input information, but the program (2) acquires input information. During this time period, the game sound is reduced or not output. If a button is operated, the notification image is made to be non-displayed, and then, the program (1) acquires the input information. This makes it possible for the player to reliably recognize the notification (notification image) related to the program (2).

In the third pattern, the program (2) is concurrently executed with the program (1), and as shown in FIG. 2C, the second image related to the program (2) is displayed as a part of the first image to cover substantially a lower half of the first image. For example, the first image shown in FIG. 2C is a game screen. On the other hand, the second image shown in FIG. 2C is a display screen of a received mail or a composition screen of reply (transmission) mail. However, a software keyboard is also displayed when the composition screen of reply (transmission) mail is displayed.

In this third pattern, since a half of the first image is substantially covered with the second image, the player can perform an operation on the second image that is displayed on the front, but cannot perform an operation on the first image that is displayed on the back.

In the third pattern, when the player performs an operation on the display screen of the received mail, according to an operation by the player, the display screen may be scrolled, or the composition screen of reply mail may be displayed instead of the display screen. Moreover, in the third pattern, when the player performs an operation on the composition (transmission) screen of reply mail, according to an operation of the player, a destination and a subject may be entered or changed, a body text may be input, or transmitting the reply mail or transmission mail may be instructed. In these cases, a click sound accompanying the operation for an email is output from the speaker 28, and the vibration accompanying the operation for an email is presented from the vibration motor 32. In such a case, the sound of the program (1) for the game is not output, or the sound volume of the program (1) is reduced in comparison with the sound volume of the program (2) for the email is reduced. Moreover, the vibration motor 32 is not driven according to the vibration data from the program (1).

Moreover, in the third pattern, a program (1) for an arbitrary application and a program (2) for the setting of a main body function may be executed. In this case, for example, the first image may be an execution screen of the arbitrary application, and the second image may be a setting screen of the main body function. As described above, the main body function is the sound volume, brightness of screen, wireless communication function, etc.

When the player sets the main body function, according to an operation of the player, control of the sound volume, control of the brightness of screen, turn-on/off of the wireless communication function, etc. are performed. In such a case, the click sound accompanying an operation of setting the main body function is output from the speaker 28, and the vibration accompanying an operation of setting the main body function is presented from the vibration motor 32. Since no operation is performed on the arbitrary application at this time, the sound of the program (1) is not output, or the sound volume of the program (1) is reduced in comparison with the sound volume of the sound of the program (2). Moreover, the vibration motor 32 is not driven according to the vibration data from the program (1).

In the fourth pattern, the program (2) is concurrently executed with the program (1), and as shown in FIG. 2D, the second image related to the program (2) is displayed so as to cover the whole first image related to the program (1). In addition, a state where only the program (2) is executed and thus only the second image is displayed on the display device 24 is classified into the above-described first pattern.

In the fourth pattern, although the first image is in an invisible state, it is the game screen, for example, and the second image is the display screen of the received mail or the composition screen of the reply (transmission) mail.

In this fourth pattern, no operation is performed on the program (1). Therefore, the sound of the program (1) is not output, or the sound volume is reduced in comparison with the sound volume of the sound of the program (2). Moreover, the vibration motor 32 is not driven according to the vibration data from the program (1).

In the fourth pattern, when the player performs an operation on the display screen of the received mail, according to the operation by the player, the display screen may be scrolled, or the composition screen of reply mail may be displayed instead of the display screen. Moreover, in the fourth pattern, when the player performs an operation on the reply (transmission) mail composition screen, according to the operation of the player, a destination and a subject may be entered or changed, a body text may be input, or transmitting the reply mail or transmission mail may be instructed. In these cases, a click sound accompanying the operation for an email is output from the speaker 28, and the vibration accompanying the operation for an email is presented from the vibration motor 32.

Thus, in this first embodiment, when the vibration data are simultaneously input from two different programs, a program that is to be granted with a priority for indicating a priority level of vibration control (hereinafter, called "vibration control right") is determined according to a predetermined rule (first rule), and when performing the vibration control, the vibration data from the program having been granted with the vibration control right is used. Moreover, when the sound data are simultaneously input from two different programs, one or more programs each to be granted with authority of performing sound output control (sound control) (sound output right) is to be granted are determined according to a second rule different from the first rule, and when granting the sound output right to a plurality of programs, the sound data from respective programs are used while controlling the sound volumes.

In this first embodiment, basically, the vibration control right is granted to a program corresponding to an image displayed on the uppermost part (front most) of the display plane of the display device 24. Therefore, in a case shown in FIG. 2A (the first pattern), the vibration control right is granted to the program (1). In this case, authority of acquiring input information from the input device 20 (controller) (hereinafter, called "acquisition right") is held by the program (1). Similarly, in a case shown in FIG. 2D (the fourth pattern), the program (2) is granted with the vibration control right. In this case, the acquisition right is held by the program (2).

However, when a plurality of images (first image and second image) are displayed on the display plane of the display device 24 like cases shown in FIG. 2B and FIG. 2C, it is determined, according to whether the acquisition right is held by which program, the vibration control right is to be granted to a program corresponding to which image.

The vibration control right is granted to one program out of one or more programs being executed (activated) according to such the first rule. Then, as described later, when receiving a vibration generating request simultaneously from a plurality of programs, the vibration motor 32 is driven based on the vibration value from a program having the vibration control right.

Moreover, the sound output right is basically granted to a program being executed. Furthermore, in a case where there are plurality of programs each being executed, the sound output right is granted to each program being executed, and balance information of sound volume for controlling the sound volumes of the sound data that are input from respective programs is set.

Therefore, in a case shown in FIG. 2A (the first pattern), the sound output right is granted to the program (1). In this case, the sound data of the program (1) is output to the speaker 28 through the D/A converter 26.

Moreover, in cases shown in FIG. 2B-FIG. 2D (the second pattern-the fourth pattern), the sound output right is granted to the program (1) and the program (2). In these cases, the balance information of sound volume is set based on the acquisition right as an example. The balance information of sound volume is set with a ratio (for example, 4:1) of the sound volume of the sound data of the program having the acquisition right and the sound volume of the sound data of the program not having the acquisition right. Moreover, the balance information of sound volume may be set, without relation to the acquisition right, by instructing how much the volume is controlled for each program. For example, the sound volume may be maintained as it is (without controlling) as for the sound data of the program (1), and the sound volume may be controlled to 20 percents (%) as for the sound data of the program (2).

When the sound output right is granted to one or more programs each being executed (activated) according to such the second rule, and when the sound output right is granted to a plurality of programs, according to such the second rule, the balance information of sound volume is further set.

In addition, although the second rule for setting both the sound output right and the balance information of sound volume is different from the first rule for setting the vibration control right, the same rule may be adopted.

Figure 3:
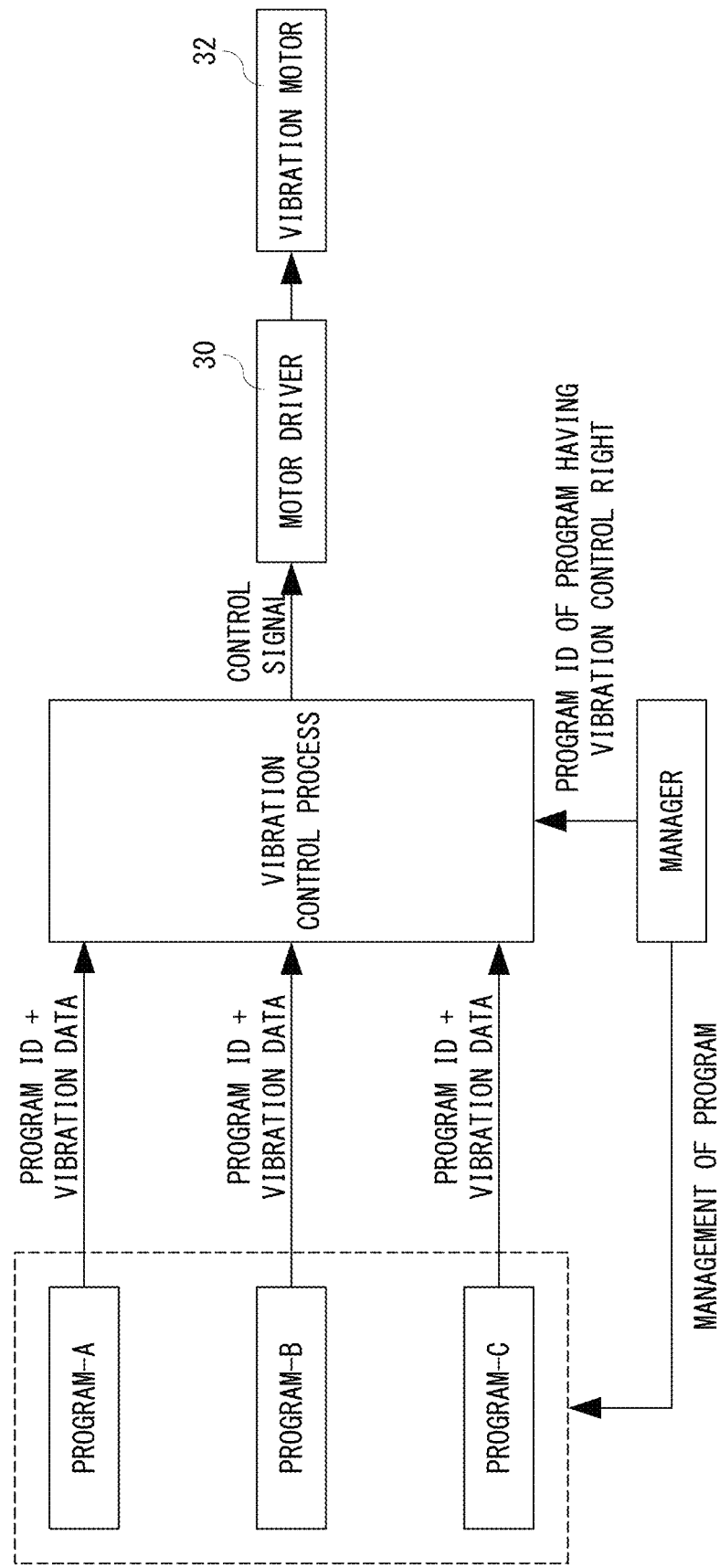
FIG. 3 is a functional block diagram showing a non-limiting example vibration control process in a first embodiment.

FIG. 3 is a functional block diagram showing a non-limiting example vibration control function of the game apparatus 10. A plurality of programs are stored in the game apparatus 10. In the example shown in FIG. 3, a program A, a program B and a program C are stored in the game apparatus 10.

The program A-program C stored in the game apparatus 10 include processing that presents vibration, and in case of presenting the vibration, vibration data is input to a vibration control process together with own identification information (program ID). A manager manages a start (execution), termination, status transition, etc. of each program, and notifies the program ID having the vibration control right to the vibration control process. However, the manager determines a program to be granted with the vibration control right according to the above-described first rule. The vibration control process outputs a control signal (vibration value) based on the vibration data that is input together with the program ID of the program that has the vibration control right to a motor driver 30 when the vibration data are simultaneously input from a plurality of (two, in the first embodiment) programs. The motor driver 30 drives the vibration motor 32 based on the vibration data from the program having the vibration control right.

Figure 4:
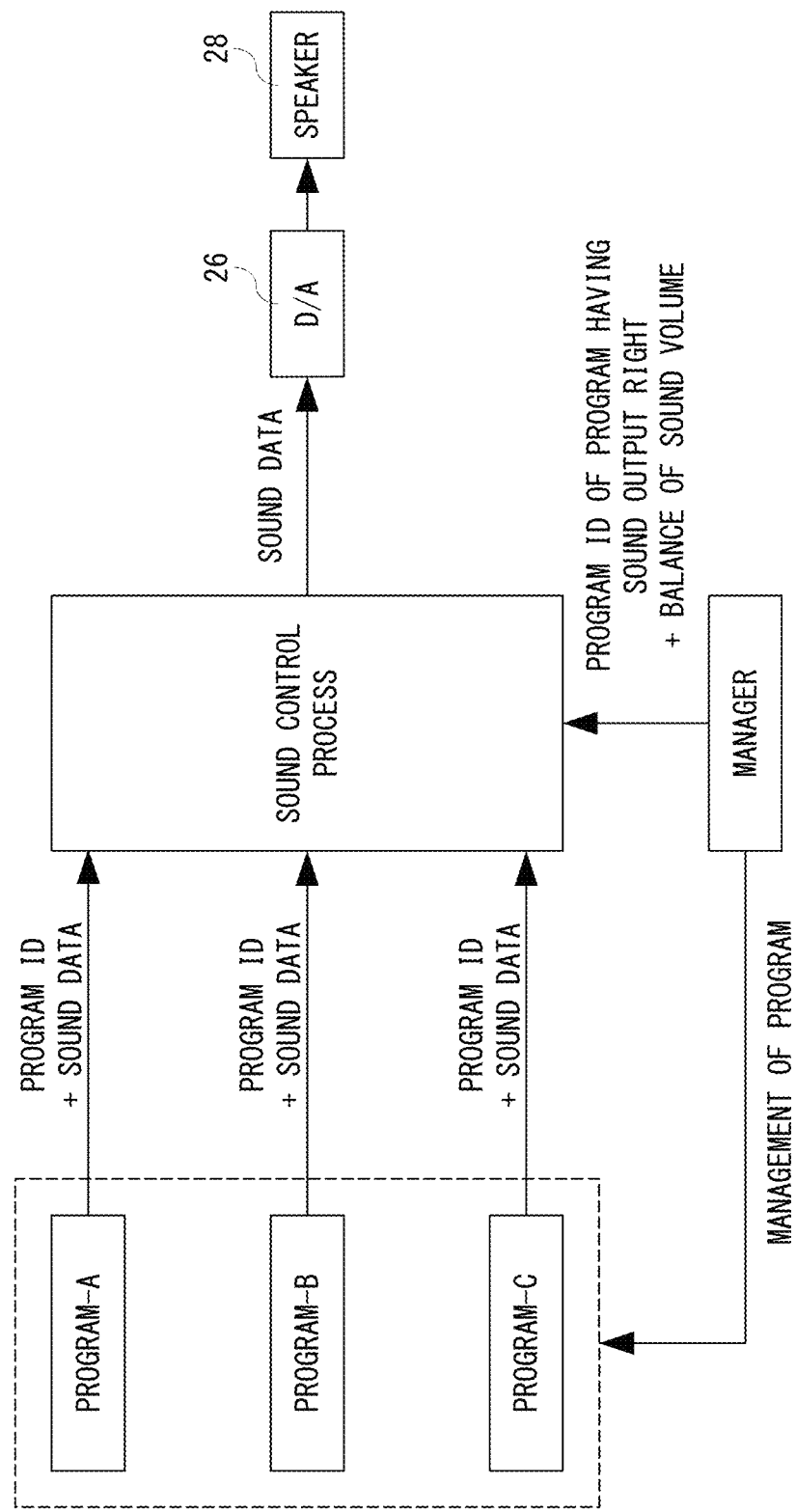
FIG. 4 is a functional block diagram showing a non-limiting example sound control process in a first embodiment.

Next, a sound output control function in the game apparatus 10 will be described. FIG. 4 is a functional block diagram showing a non-limiting example sound output control process of the game apparatus 10. The sound control process is performed separately from the above-described vibration control process. A program A-program C also include sound output processing that outputs a sound (voice, music), and when outputting the sound, sound data is input to the sound control process together with an own identification information (program ID). A manager notifies to the sound control process the balance information of sound volume together with the program ID of the program that has a priority (sound output right) for control of sound output (sound control). However, the manager determines a program to be granted with the sound output right according to the above-described second rule. That is, basically, the sound output right is granted to the program being executed, and when executing a plurality of programs, the balance information of sound volume for controlling the sound volume of the sound data that are input from respective programs is set. The sound control process controls, based on the balance information of sound volume, the sound volumes of the sound data from the respective programs when receiving sound output requests simultaneously from a plurality of (two) programs, that is, when two pieces of sound data are input, and outputs sound data obtained by mixing the controlled sound data to the D/A converter 26. Therefore, a voice (sound) that is output from the speaker 28 can be heard by the player.

Figure 5:
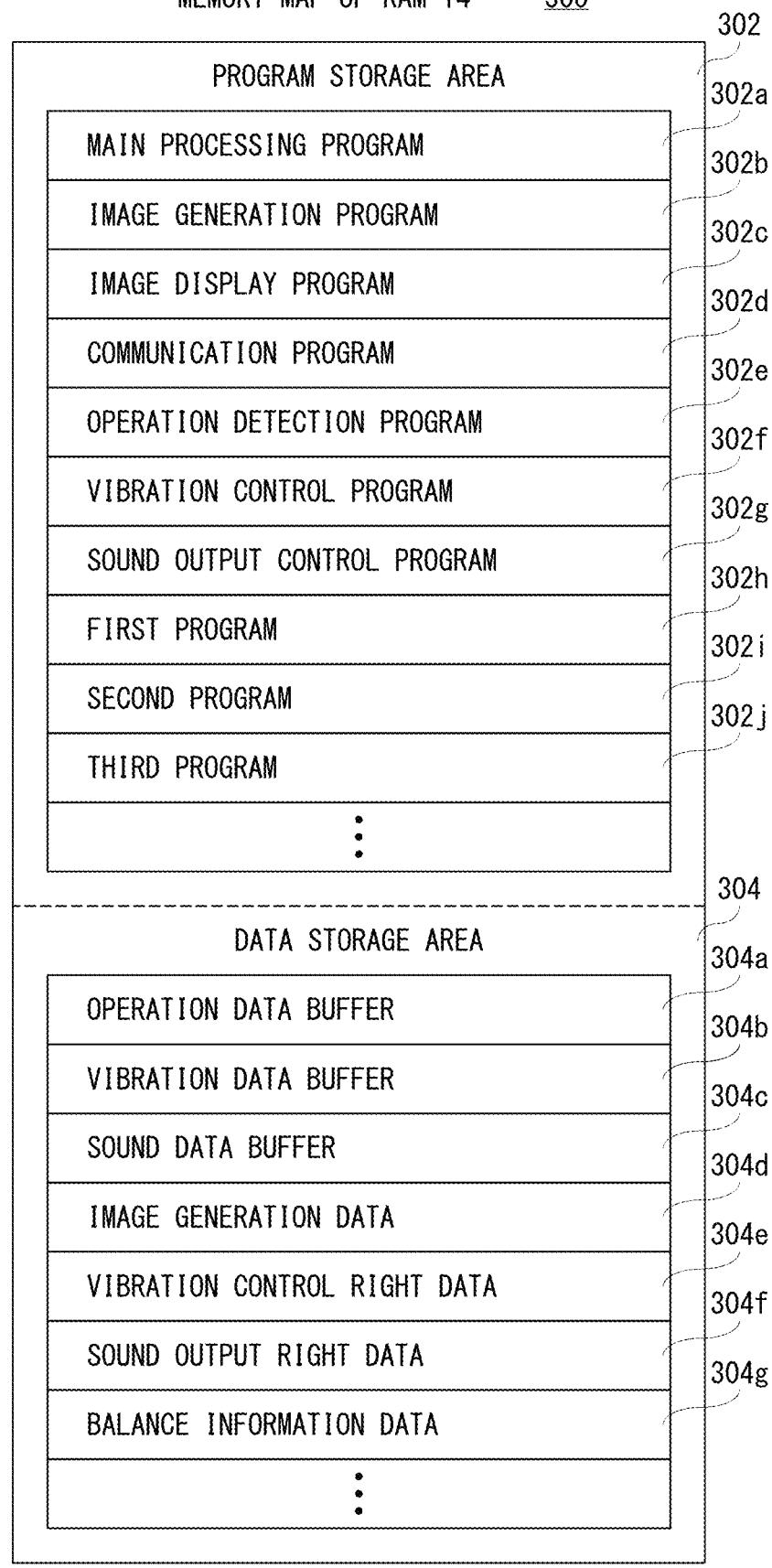
FIG. 5 is an illustration view showing a non-limiting example memory map of a RAM of the game apparatus shown in FIG. 1.

FIG. 5 is an illustration view showing a non-limiting example memory map 300 of the RAM 14 shown in FIG. 1. As shown in FIG. 5, the RAM 14 includes a program storage area 302 and a data storage area 304. Various kinds of programs are stored in the program storage area 302. The various programs are partly or wholly read from the flash memory 16 and stored in the RAM 14, at a proper timing after a power source is supplied to the game apparatus 10.

In addition, instead of the flash memory 16, the various programs may be acquired (downloaded) from a memory or optical disk attachable/detachable to or from the game apparatus 10, and when the game apparatus 10 is provided with a function of communication with other information processing apparatuses (computers), the various programs may be acquired directly or via a network from the other information processing apparatus.

As shown in FIG. 5, the program storage area 302 is stored with a main processing program 302a, an image generation program 302b, an image display program 302c, a communication program 302d, an operation detection program 302e, a vibration control program 302f, a sound output control program 302g, a first program 302h, a second program 302i, a third program 302j, etc.

The main processing program 302a is a program (operating system, for example) for processing a main routine of an operation of the game apparatus 10. The image generation program 302b is a program for generating image data corresponding to images to be displayed on the display device 24 with using image generation data 304b including polygon data, texture data, etc. The image display program 302c is a program for outputting the image data generated according to the image generation program 302b to the display device 24.

The communication program 302d is a program for performing communication with other game apparatuses 10 or computers. The operation detection program 302e is a program for detecting operation data from the input device 20 so as to store the operation data in an operation data buffer 304a.

The vibration control program 302f is a control program for performing drive control of the vibration motor 32 with using the vibration data that is input from the first program 302h, the second program 302i or the third program 302j having the vibration control right. Moreover, the vibration control program 302f includes a management program that manages a start (execution), termination and status transition of the system program and the application program and determines the system program and the application program to be granted with the vibration control right.

The sound output control program 302g is a control program for control (sound output control) that outputs a sound (voice, music) with using the sound data that is input from at least one of the first program 302h, the second program 302i and the third program 302j having the sound output right. Moreover, the sound output control program 302g includes a management program that manages a start (execution), termination and status transition of the system program and the application program, and determines the system program and the application program to be granted with the sound output control right, and sets the balance information of sound volume.

Each of the first program 302h-third program 302j is a system program or an application program. The first program 302h-third program 302j correspond to the program A-program C shown in FIG. 3 and FIG. 4, and include the processing that generates vibration and the processing that outputs a sound.

In addition, although illustration is omitted, the program storage area 302 is further stored with a save program for saving, in the flash memory 16, data generated by executing the first program 302h-third program 302j etc.

Moreover, although the first program 302h-the third program 302j are stored in the program storage area 302, it is sufficient that at least one program is stored, and four or more programs may be stored.

The data storage area 304 is stored with the operation data buffer 304a, a vibration data buffer 304b, a sound data buffer 304c, the image generation data 304d, a vibration control right data 304e, a sound output right data 304f, balance information data 304g, etc.

The operation data buffer 304a is stored with the operation data detected by the operation data detection program 302e according to time series. The vibration data buffer 304b is stored with the vibration data (program ID is added) that is input from one or more programs being executed. The sound data buffer 304c is stored with the sound data (program ID is added) that is input from one or more programs being executed.

The image generation data 304b is data for generating image data corresponding to images (screens) to be displayed on the display device 24, such as polygon data, texture data, etc. The vibration control right data 304e is data about a program ID indicative of one program having the vibration control right among one or more programs being executed. The sound output control right data 304f is data about a program ID indicative of one or more programs having the sound output control right among one or more programs being executed. The balance information data 304g is data on balance information (ratio or rate) for controlling the balance of sound volume of the sound data from a plurality of programs each having the sound output right.

Although illustration is omitted, the data storage area 304 is stored with other data necessary for controlling the operation of the game apparatus 10, and provided with counters (timers) required necessary for controlling the operation of the game apparatus 10.

Figure 6:
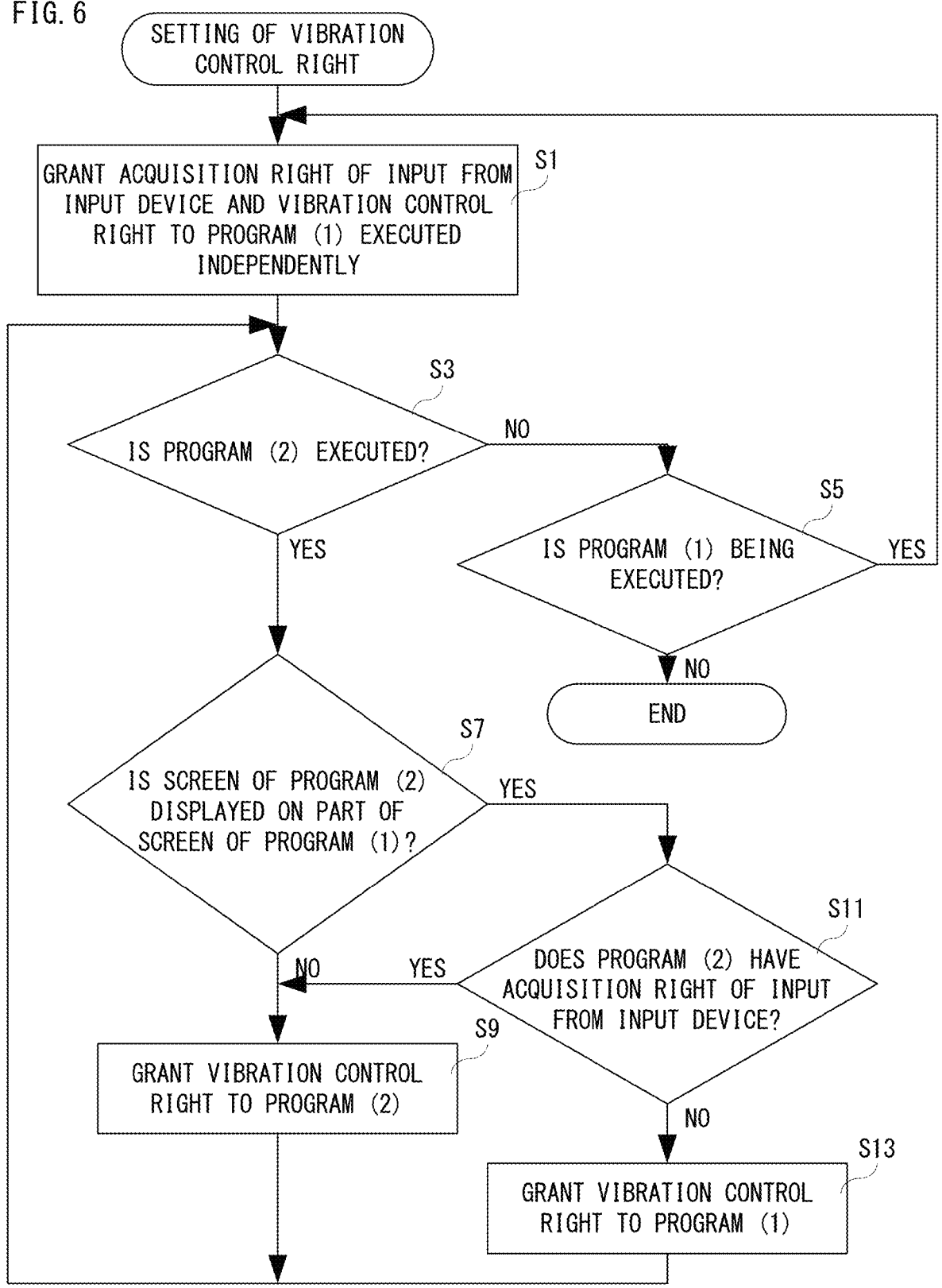
FIG. 6 is a flow chart showing non-limiting example vibration control right setting processing of a CPU shown in FIG. 1.

FIG. 6 is a flow chart showing non-limiting example vibration control right setting processing of the CPU 12 shown in FIG. 1. The CPU 12 starts the setting processing of the vibration control right in response to a predetermined timing that the application containing processing that presents vibration is started, that a predetermined event occurs in the application concerned or the like.

As shown in FIG. 6, if the vibration control right setting processing (processing by the manager) is started, the CPU 12 grants, in a step S1, an acquisition right of an input from the input device 20 and a vibration control right to the program (1) that is executed alone. Here, the CPU 12 stores the vibration control right data 304e for the identification information indicative of the program (1) to the data storage area 304. In the following, this is true for a case of granting the vibration control right.

In a next step S3, it is determined whether the second program (2) is executed. If "NO" is determined in the step S3, that is, if the second program (2) is not executed, it is determined, in a step S5, whether the program (1) is being executed.

If "NO" is determined in the step S5, that is, if the program (1) is ended, the vibration control right setting processing is terminated. On the other hand, if "YES" is determined in the step S5, that is, if the program (1) is being executed, the process returns to the step S1.

Moreover, if "YES" is determined in the step S3, that is, if the second program (2) is executed, it is determined, in a step S7, whether a screen of the second program (2) is displayed on a part of a screen of the program (1).

If "NO" is determined in the step S7, that is, if the screen of the program (2) is displayed forefront so as to cover the screen of the program (1) as in the fourth pattern shown in FIG. 2D, the process returns to the step S3 after granting the vibration control right to the second program (2) in a step S9.

On the other hand, if "YES" is determined in the step S7, that is, if the screen of the second program (2) is displayed on a part of the screen of the program (1), it is determined, in a step S11, whether the program (2) has the acquisition right of an input of the input device 20.

If "YES" is determined in the step S11, that is, if the program (2) has the acquisition right of an input of the input device 20 as in the third pattern shown in FIG. 2C, the process proceeds to the step S9. On the other hand, if "NO" is determined in the step S11, that is, if the program (1) has the acquisition right of an input of the input device 20 as in the second pattern shown in FIG. 2B, the vibration control right is granted to the program (1) in a step S13, and then, the process returns to the step S3.

Figure 7:
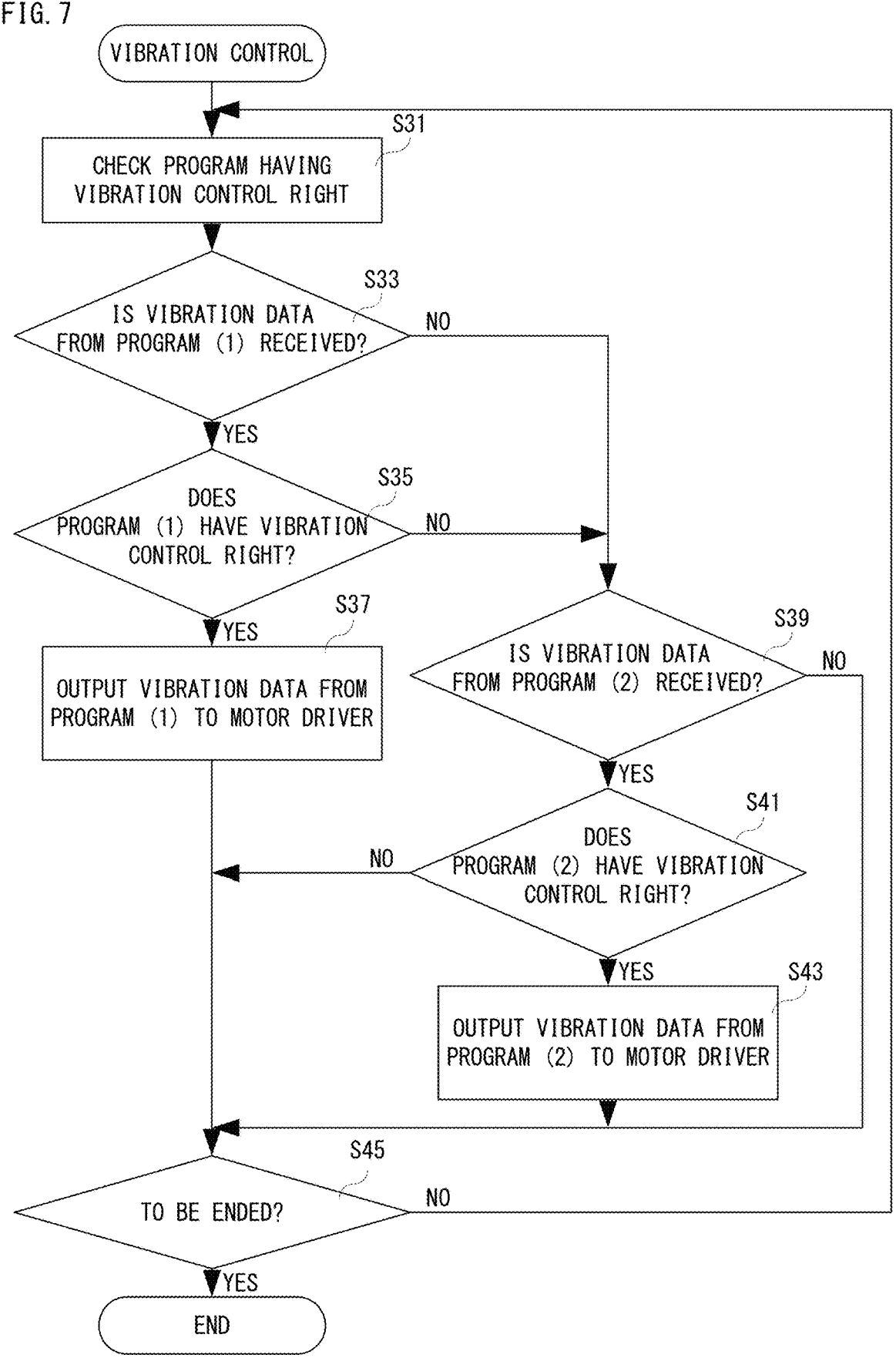
FIG. 7 is a flow chart showing non-limiting example vibration control processing of the CPU shown in FIG. 1.

FIG. 7 is a flow chart showing non-limiting example vibration control processing (vibration control process) of the CPU 12 shown in FIG. 1. The vibration control processing is started when the power source of the game apparatus 10 is turned on, or when any program (the program A, B or C, in FIG. 3) is started.

As shown in FIG. 7, if the vibration control processing is started, in a step S31, the CPU 12 refers to the vibration control right data 304e, thereby to confirm a program having the vibration control right. In a next step S33, it is determined whether the vibration data from the program (1) is received. If "NO" is determined in the step S33, that is, if the vibration data is not received from the program (1), the process proceeds to a step S39. On the other hand, if "YES" is determined in the step S33, that is, if the vibration data is received from the program (1), it is determined, in a step S35, whether the program (1) has the vibration control right.

If "NO" is determined in the step S35, that is, if the program (1) does not have the vibration control right, the process proceeds to the step S39. On the other hand, if "YES" is determined in the step S35, that is, if the program (1) has the vibration control right, the process proceeds to a step S45 after outputting the vibration data from the program (1) to the motor driver 30 in a step S37.

In the step S39, it is determined whether the vibration data from the program (2) is received. If "NO" is determined in the step S39, that is, if the vibration data is not received from the program (2), the process proceeds to the step S45. On the other hand, if "YES" is determined in the step S39, that is, if the vibration data is received from the program (2), it is determined, in a step S41, whether the program (2) has the vibration control right.

If "NO" is determined in the step S41, that is, if the program (2) does not have the vibration control right, the process proceeds to the step S45. On the other hand, if "YES" is determined in the step S41, that is, if the program (2) has the vibration control right, the process proceeds to the step S45 after outputting the vibration data from the program (2) to the motor driver 30 in a step S43.

In the step S45, it is determined whether it is to be ended. Here, the CPU 12 determines whether execution of all the application programs is ended, or the power source of the game apparatus 10 is turned off. If "NO" is determined in the step S45, that is, if it is not to be ended, the process returns to the step S31. On the other hand, if "YES" is determined in the step S45, that is, if it is to be ended, the vibration control processing is terminated.

Figure 8:
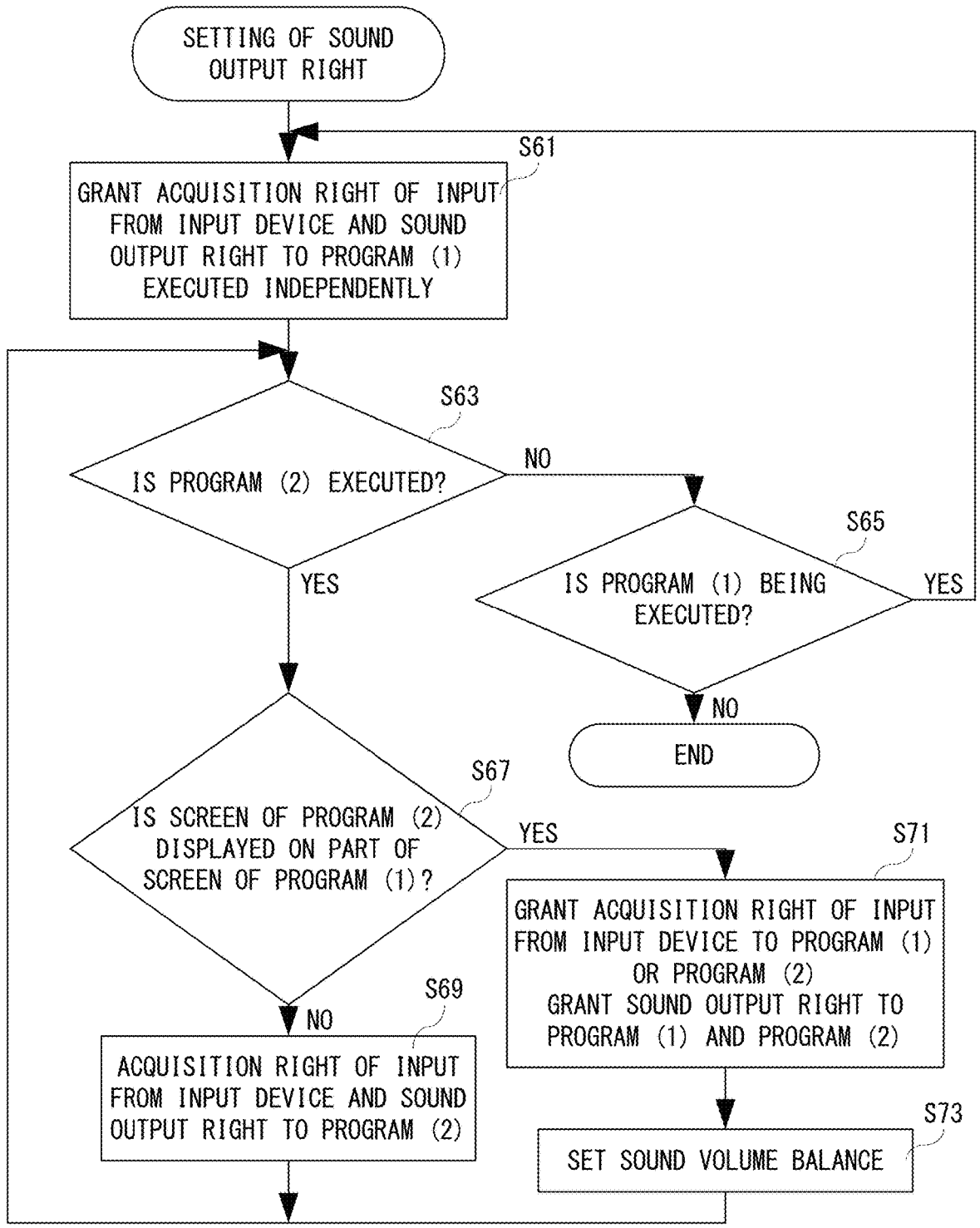
FIG. 8 is a flow chart showing non-limiting example sound output right setting processing of the CPU shown in FIG. 1.

FIG. 8 is a flow chart showing non-limiting example sound output right setting processing of the CPU 12 shown in FIG. 1. In the following, although the sound output right setting processing will be described, the same contents as those the vibration control right setting processing shown in FIG. 6 will be briefly described.

The CPU 12 starts the sound output right setting processing in response to a predetermined timing that the program containing processing that outputs sound is started. As shown in FIG. 8, if the sound output right setting processing is started, the CPU 12 grants the acquisition right of an input of the input device 20 and the sound output right to the program (1) that is executed alone. Here, the CPU 12 stores the sound output right data 304f for the identification information indicative of the program (1) to the data storage area 304. In the following, this is true for a case of granting the sound output right.

In a next step S63, it is determined whether the second program (2) is executed. If "NO" is determined in the step S63, it is determined, in a step S65, whether the program (1) is being executed. If "NO" is determined in the step S65, the sound output right setting processing is terminated. On the other hand, if "YES" is determined in the step S65, the process returns to the step S61.

Moreover, if "YES" is determined in the step S63, it is determined, in a step S67, whether a screen of the second program (2) is displayed on a part of a screen of the program (1). If "NO" is determined in the step S67, the process returns to the step S63 after granting the acquisition right of an input of the input device 20 and the sound output right to the second program (2) in a step S69. On the other hand, if "YES" is determined in the step S67, in a step S71, the CPU grants the acquisition right to the program (1) or the program (2) and the sound output right to the program (1) and the program (2). In order to manage a start, termination, status transition, etc. of the program, the CPU 12 grants the acquisition right to the program (1) or the program (2) in the step S71 according to the content to be managed. Then, in the step S73, the balance information of sound volume is set, and the process returns to the step S63. In the step S73, the balance information data 304g is stored in the data storage area 304.

Figure 9:
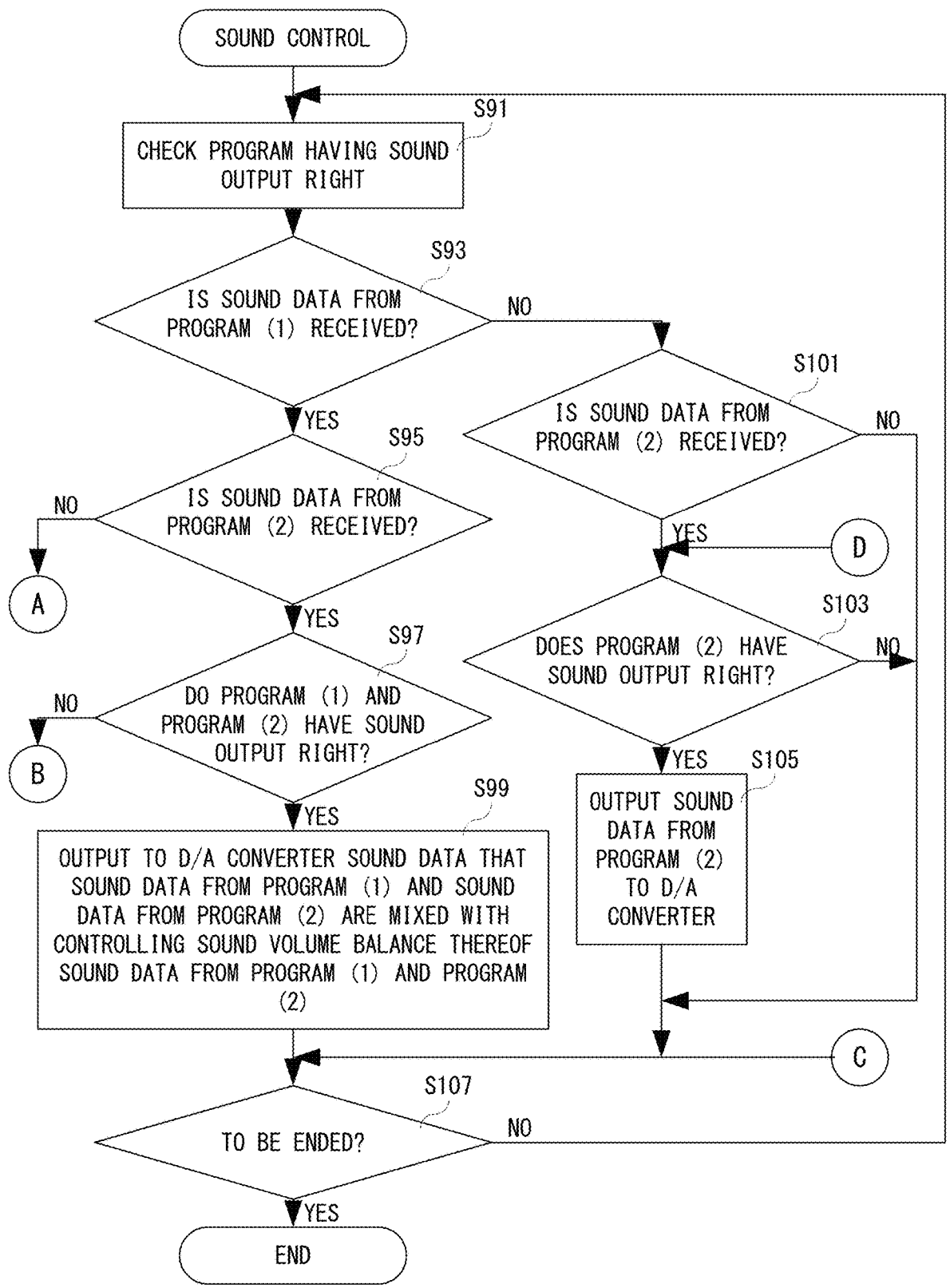
FIG. 9 is a flow chart showing a part of non-limiting example sound control processing of the CPU shown in FIG. 1.
Figure 10:
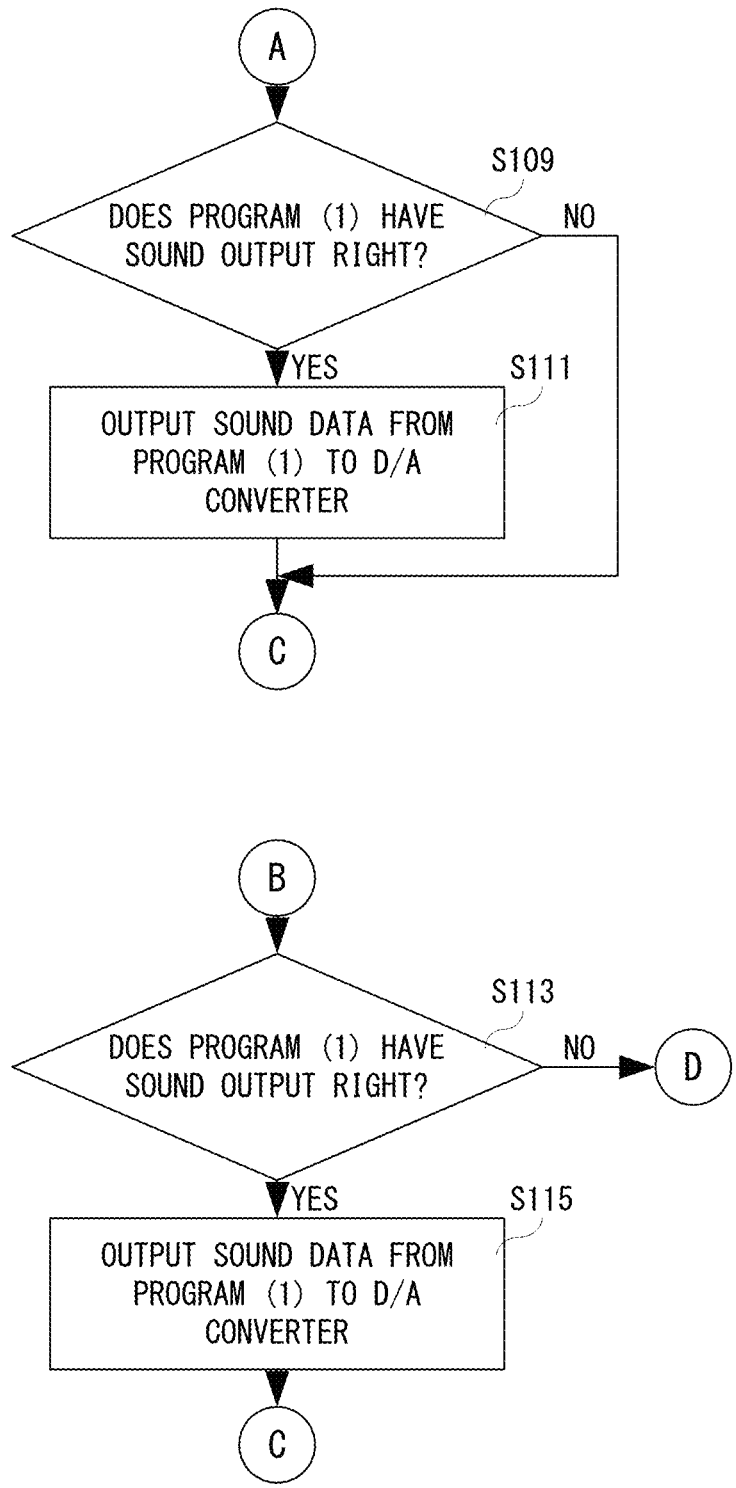
FIG. 10 is a flow chart showing another part of the non-limiting example sound control processing of the CPU shown in FIG. 1, following FIG. 9.

FIG. 9 and FIG. 10 are flow charts showing non-limiting example sound control processing (sound control process) of the CPU 12 shown in FIG. 1. The sound control processing is started when the power source of the game apparatus 10 is turned on, or when any application program is started. In the following, although the sound control processing will be described, the same contents as those of the vibration control right setting processing shown in FIG. 6 will be briefly described.

As shown in FIG. 9, if the sound control processing is started, in a step S91, the CPU 12 refers to the sound output right data 304f, thereby to confirm a program that has the sound output right. In a next step S93, it is determined whether the sound data from the program (1) is received.

If "YES" is determined in the step S93, it is determined, in a step S95, whether the sound data from the program (2) is received. If "NO" is determined in the step S95, it is determined, in a step S109 shown in FIG. 10, the program (1) has the sound output right. If "NO" is determined in the step S109, the process proceeds to a step S107 of FIG. 9. On the other hand, if "YES" is determined in the step S109, the sound data from the program (1) is output to the D/A converter 26 in a step S111, and the process proceeds to the step S107.

On the other hand, if "YES" is determined in the step S95, it is determined, in a step S97, whether the program (1) and the program (2) each having the sound output right. If "NO" is determined in the step S97, that is, if at least one of the program (1) and the program (2) does not have the sound output right, it is determined, in a step S113 shown in FIG. 10, whether the program (1) has the sound output right. If "NO" is determined in the step S113, the process proceeds to a step S103 of FIG. 9. On the other hand, if "YES" is determined in the step S113, the sound data from the program (1) is output to the D/A converter 26 in a step S115, and the process proceeds to the step S107.

Moreover, if "YES" is determined in the step S97, that is, if the program (1) and the program (2) have the sound output right, in a step S99, the balance of the sound volume of the sound data from the program (1) and the sound volume of the sound data from the program (2) are controlled based on the balance information of sound volume indicated by the balance information data 304g, thereby to output the sound data obtained by mixing two pieces of sound data that the sound volumes are controlled to the D/A converter 26, and the process proceeds to the step S107.

Moreover, if "NO" is determined in the step S93, it is determined, in a step S101, whether the sound data from the program (2) is received. If "NO" is determined in the step S101, the process proceeds to the step S107. On the other hand, if "YES" is determined in the step S101, it is determined, in the step S103, whether the program (2) has the sound output right. If "NO" is determined in the step S103, the process proceeds to the step S107. On the other hand, if "YES" is determined in the step S103, the sound data from the program (2) is output to the D/A converter 26 in a step S105, and the process proceeds to the step S107.

In the step S107, it is determined whether it is to be ended. If "NO" is determined in the step S107, the process returns to the step S91. On the other hand, if "YES" is determined in the step S107, that is, if it is to be ended, the sound control processing is terminated.

According to this first embodiment, when there are a vibration generation request and a sound output request from a plurality of programs, the vibration is generated based on the vibration control right that is granted to the program, and the sound is generated based on the sound output right and the balance information of sound volume that are granted to the program, it is possible to appropriately present not only the vibration but also the sound.

In addition, it is described in this first embodiment that if the vibration data are simultaneously input when two programs (program (1) and program (2)) among the program A, the program B and the program C are being executed, that is, if the vibration generation requests are simultaneously received, the vibration motor is driven based on the vibration data from the program (1) or the program (2) that is granted with the vibration control right, it does not need to be limited to this. When three or more programs are being executed, a priority level of vibration control is set to each program according to a predetermined rule, and if the vibration generation requests are simultaneously received from a plurality of programs, the vibration motor is driven based on the vibration data from a program having the highest priority level.

Moreover, although the vibration motor is driven based on the vibration data from the program that holds the vibration control right in this first embodiment, it does not need to be limited to this. In some cases, the vibration control right may be granted to a plurality of programs, a ratio of mixing vibration is set, and vibration data from the plurality of programs each having vibration control right are mixed at the ratio being set, thereby to drive the vibration motor with the mixed vibration data.

Further, although the first embodiment is described for only a case where the sound (voice and music) is output from the speaker 28, the sound (voice and music) may be output to an earphone through an earphone jack.

Furthermore, in the first embodiment, when there are requests to output the sound data from a plurality of programs, the sound volume(s) of the sound data of the program having the acquisition right and the sound volume(s) of the sound data of the program not having the acquisition right are controlled, and these sound data are mixed and the mixed sound data is output to the D/A converter 26, but should not be limited to this. For example, it may be configured to fade-in the sound data that is input from the program having the acquisition right and to fade-out the sound data that is input from the program not having acquisition right. In such a case, in the sound control process, the sound volume of the sound data to be faded-in and the sound volume of the sound data to be faded-out are controlled, and these the sound data are mixed, thereby to output the mixed sound data to the D/A converter 26. However, the program to be faded-in and the program to be faded-out are notified to the sound control process from the manager.

Moreover, in the first embodiment, a case where both vibration generation and sound output are performed was described, but it is also possible to perform only the vibration generation or the sound output.

Second Embodiment

The second embodiment is the same or similar to the first embodiment except that a game apparatus 10 of the second embodiment is a stationary game apparatus, and except that a controller 200 is communicably connected to a main body of the game apparatus 10 instead of the input device 20, and vibration is generated in the controller 200, and therefore, a duplicate description will be omitted in the following.

Figure 11:
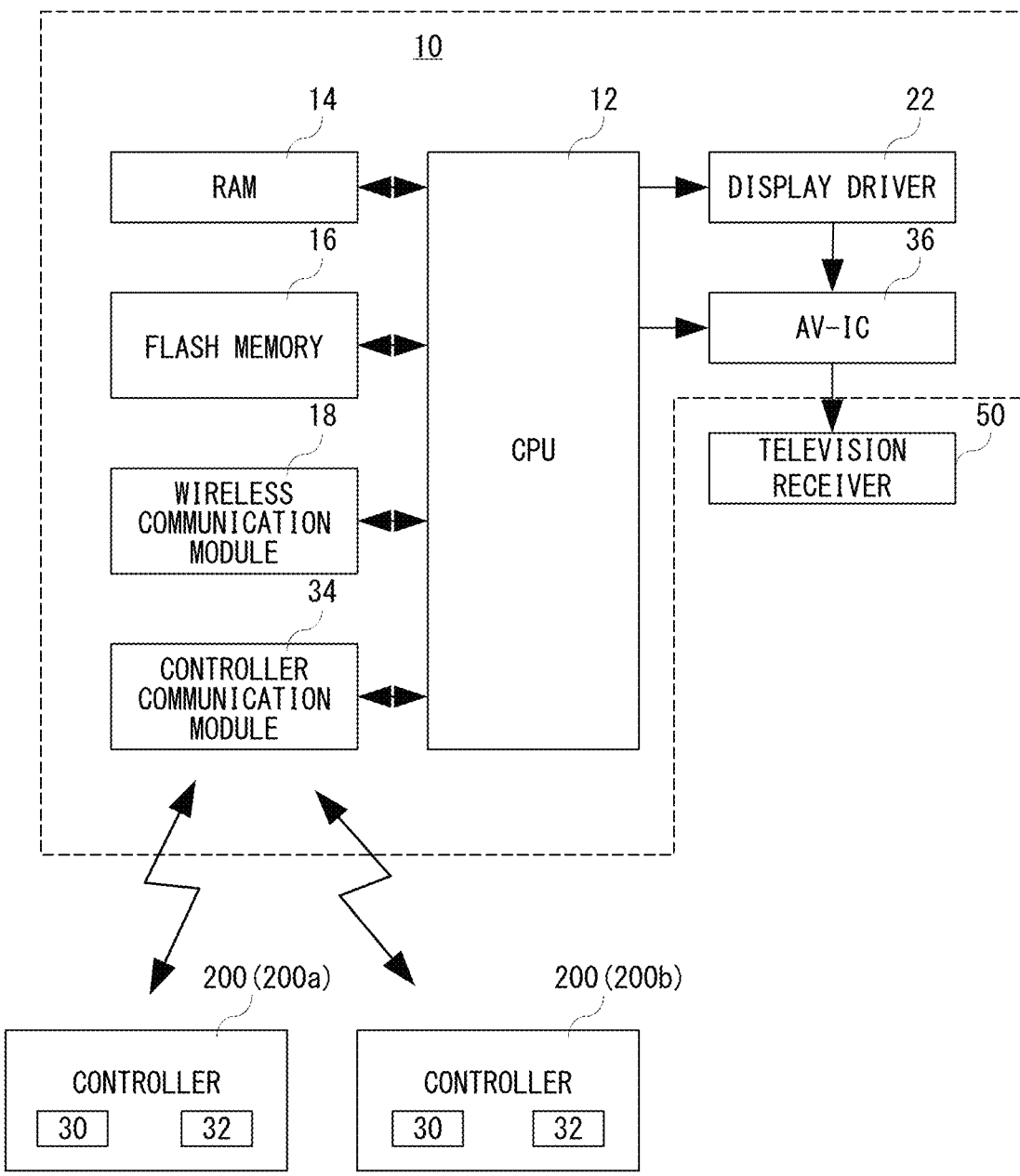
FIG. 11 is a block diagram showing a non-limiting example electric configuration of a non-limiting example game system of a second embodiment.

As shown in FIG. 11, a predetermined terminal like the controller 200 is connected to the game apparatus 10 communicably, and the television receiver 50 is also connected to the game apparatus 10. The game apparatus 10, a plurality of controllers 200 and the television receiver 50 are called a game system 100 collectively. Moreover, when it is necessary to distinguish between the two controllers 200, one controller 200 may be referred to as a first controller 200a, and the other controller 200 may be referred to as a second controller 200b.

In the second embodiment, in order to generate vibration in the controller 200, the motor driver 30 and the vibration motor 32 shown in FIG. 1 are provided in the controller 200. In addition, although two controllers 200 are communicably connected to the game apparatus 10, the number of the controllers 200 may be one (1) or three (3) or more.

In the game system 100 shown in FIG. 11, since one or more controllers 200 are connected to the game apparatus 10 wireless-communicably, a controller communication module 34 for performing wireless communication with the controller 200 is provided in the game apparatus 10. For example, the controller communication module 34 performs wireless communication according to a format of Bluetooth (registered trademark). However, wireless communication according to another format such as Wi-Fi or an infrared system may be performed. As shown in FIG. 11, in the second embodiment, operation data is transmitted to the game apparatus 10 from the controller 200, and vibration data is transmitted to the controller 200 from the game apparatus 10. That is, the game system 100 functions also as a vibration control system.

In addition, although that game apparatus 10 is made to perform wireless communication with the controller 200 in the example shown in FIG. 11, wire communication may be performed.

Moreover, in the game system 100 shown in FIG. 11, since the game apparatus 10 is connected to the television receiver 50, the display device 24 of the game apparatus 10 is omitted and an AV-IC 36 is provided. The AV-IC 36 outputs image (video) data that is input from the display driver 22 and sound data that is input from the CPU 12 to the television receiver 50. Therefore, a screen of a program executed in the game apparatus 10 is displayed on a television monitor, and voice (sound) generated during execution of the program is output from a speaker of the television receiver 50.

Figure 12:
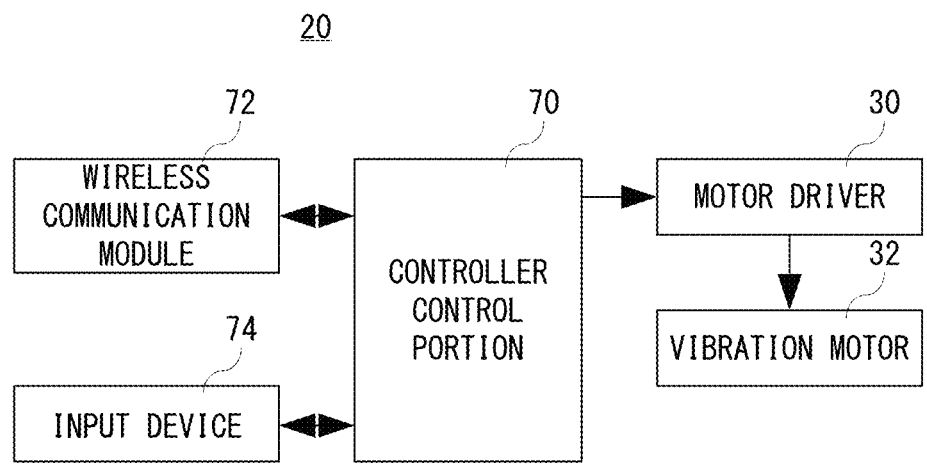
FIG. 12 is a flow chart showing a non-limiting example electric configuration of a controller shown in FIG. 11.

FIG. 12 is a block diagram showing a non-limiting example electric configuration of the controller 200 shown in FIG. 11. As shown in FIG. 12, the controller 200 includes a controller control portion 70, and a wireless communication module 72, an input device 74 and a motor driver 30 are connected to the controller control portion 70. Moreover, a vibration motor 32 is connected to the motor driver 30.

The controller control portion 70 is a general-purpose microcomputer, for example, and includes circuitry components, such as a processor, a memory, etc. The processor included in the controller control portion 70 controls transmission and reception of data to and from the game apparatuses 10. Moreover, identification information for identifying the controller 200 is stored in a ROM provided in the controller control portion 70.

The wireless communication module 72 is a communication circuitry for performing communication with the controller communication module 34 provided in the game apparatus 10, and the communication is performed according to the format of Bluetooth (registered trademark) that is the same as those of the controller communication module 34. However, when the controller communication module 34 performs wireless communication according to a further format, as for the wireless communication module 72, it is necessary to use a module capable of performing similarly wireless communication according to the further format.

Although illustration is omitted, the input device 74 includes various kinds of operation buttons or switches, a joystick or/and slide pad that are provided on the controller 200, and inputs operation data according to an operation by the player to the controller control portion 70. The controller control portion 70 transmits the operation data that is input from the input device 74 to the game apparatus 10 by using the wireless communication module 72 at the timing of every predetermined time. The identification information of the controller 200 is added to the operation data.

Moreover, the vibration data that is transmitted from the game apparatus 10 is received by the controller communication module 34, and is input to the controller control portion 70. The controller control portion 70 outputs the input vibration data to the motor driver 30. The motor driver 30 generates a drive signal based on the vibration data, and applies the generated drive signal to the vibration motor 32. Therefore, the vibration motor 32 operates according to the vibration data. Accordingly, vibration generated by driving the vibration motor 32 is conveyed to the player that holds the controller 200.

In addition, the vibration data to be transmitted to the controller 200 is the same as the vibration data that is output from the CPU 12 (vibration control process) of the game apparatus 10.

Figure 13:
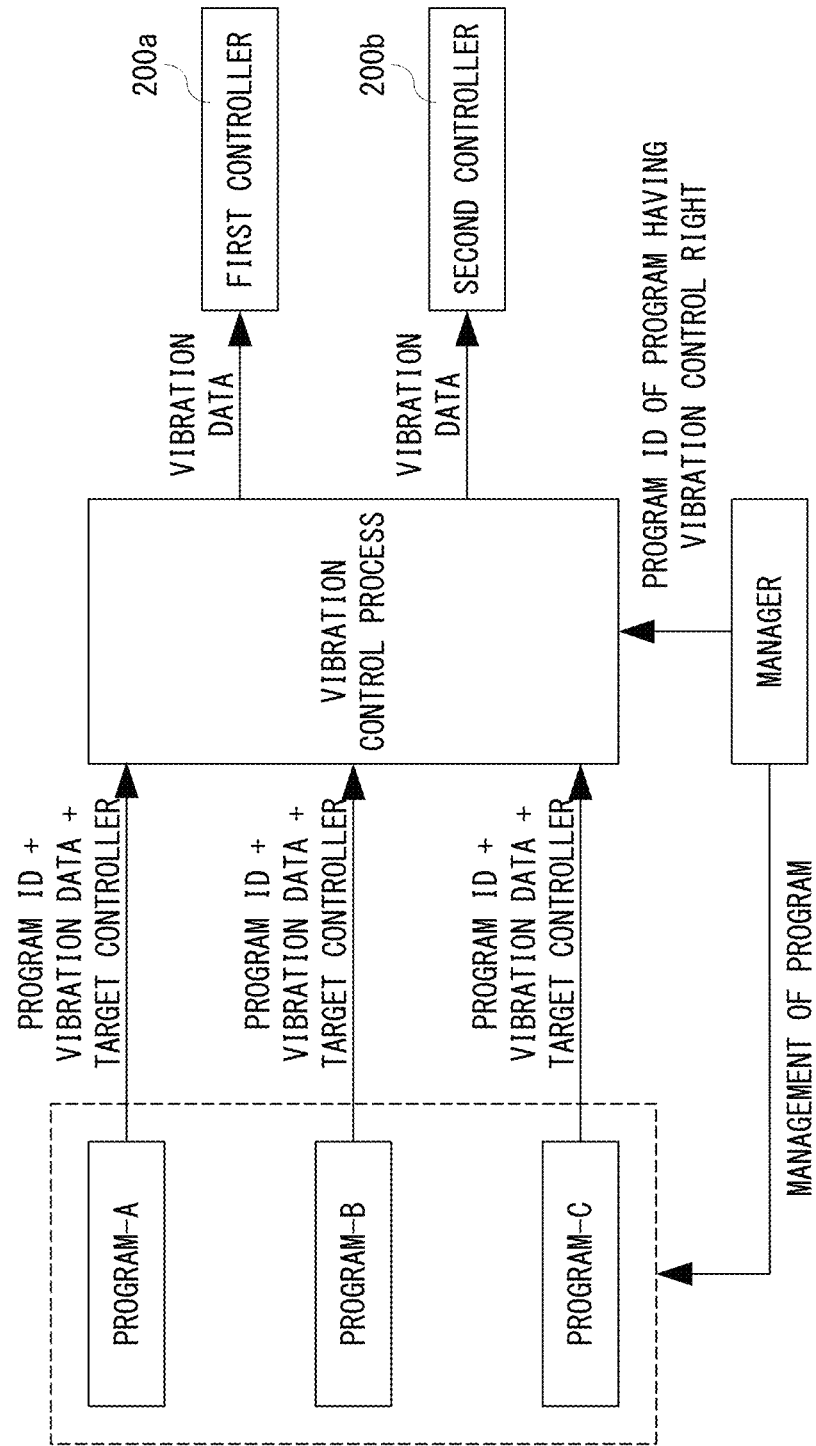
FIG. 13 is a functional block diagram showing a non-limiting example vibration control process of the second embodiment.

FIG. 13 is a functional block diagram showing a non-limiting example vibration control function of the game apparatus 10 in the second embodiment. In the second embodiment, since a plurality of controllers 200 are connected, a program inputs to the vibration control process the identification information of a target controller to vibrate (to transmit the vibration data) in addition to the program ID and the vibration data. The vibration control process transmits the vibration data of a program corresponding to the program ID notified by the manager to the first controller 200a or/and the second controller 200b. The controller 200 of a destination for the vibration data is determined according to the target controller that is input to the vibration control process from the program.

However, the identification information of the controller 200 is transmitted (notified) to the game apparatus 10 from the controller 200 when the controller 200 is connected to the game apparatus 10 (link processing).

Although illustration is omitted, also in the second embodiment, the vibration control right setting processing is executed according to the flow chart shown in FIG. 6. Moreover, also in the second embodiment, the vibration control processing is executed according to the flow chart shown in FIG. 7. As described above, the controller 200 of the target that presents the vibration is designated from the program.

According to the second embodiment, when vibrating the controller communicably connected to the game apparatus, it is possible to appropriately present the vibration like the first embodiment.

In addition, although a case where a stationary type game apparatus is used in the second embodiment, if a motor driver and a vibration motor are provided in the controller (input device), an arcade game, a personal computer having a game function, etc. are also can be used.

Moreover, the specific configuration of the apparatus or device and the specific numerical values are mere exemplification, and can be changed suitably according to actual products. For example, processing of respective steps of flowchart of FIG. 6-FIG. 9 are mere example, and if the same or similar effect (result) is obtained, an order of the steps may be exchanged.

Although certain example systems, methods, storage media, devices and apparatuses have been described herein, it is to be understood that the appended claims are not to be limited to the systems, methods, storage media, devices and apparatuses disclosed, but on the contrary, are intended to cover various modifications and equivalent arrangements included within the spirit and scope of the appended claims.

What is claimed is:

1. A vibration control system, comprising:
   a processor connected to a memory storing software instructions that, when executed by the processor, cause the processor to perform operations comprising:
   first vibration reception configured to receive first vibration data that first software generates;
   second vibration reception configured to receive second vibration data that second software generates; and
   vibration control configured to, when the second vibration reception receives the second vibration data at the same time that the first vibration reception receives the first vibration data, select between the first vibration data and the second vibration data and make a predetermined apparatus or a predetermined terminal connected to the predetermined apparatus vibrate by using the selected one of the first vibration data and the second vibration data and not the other one of the first vibration data and the second vibration data that was not selected.

2. The vibration control system according to claim 1, wherein the processor is further configured to set a priority for indicating a priority level of vibration control for the first software and the second software, wherein the vibration control operation is configured to use a selected one of the first vibration data and the second vibration data according to the priority that is set.

3. The vibration control system according to claim 2, wherein the first software further generates first sound data and the second software further generates second sound data, and the processor is further set a sound volume balance in sound control for the first software and the second software;
perform a first sound reception operation configured to receive the first sound data;
perform a second sound reception operation configured to receive the second sound data; and
perform a sound control operation configured to output, when the second sound reception receives the second sound data at the same time that the first sound reception receives the first sound data, at least one of the first sound data and the second sound data while changing an amplitude thereof according to the sound volume balance that is set by the sound volume balance setting.

4. The vibration control system according to claim 1, wherein the first software is concurrently executed with the second software.

5. The vibration control system according to claim 1, wherein at least one of the first software and the second software is a game program.

6. The vibration control system of claim 1 wherein the vibration control operation outputs only the selected one of the first vibration data and the second vibration data and suppresses output of a non-selected one of the first vibration data and the second vibration data.

7. The vibration control system of claim 1 wherein the first vibration data is assigned a first priority level, the second vibration data is assigned a second priority level, and the processor is configured to select between the first vibration data and the second vibration data based on which of the first and second priority levels has a higher priority.

8. The vibration control system of claim 1 wherein the processor is configured to select between the first vibration data and the second vibration data based on which has a higher priority.

9. A vibration control apparatus, comprising:
a processor connected to a memory storing software instructions that, when executed by the processor, cause the processor to perform operations comprising:
first vibration reception configured to receive first vibration data that first software generates;
second vibration reception configured to receive second vibration data that second software generates; and
vibration control configured to, when the second vibration reception receives the second vibration data at the same time that the first vibration reception receives the first vibration data, select between the first vibration data and the second vibration data and make a predetermined apparatus or a predetermined terminal connected to the predetermined apparatus vibrate by using the selected one of the first vibration data and the second vibration data and not the other one of the first vibration data and the second vibration data that was not selected.

10. The vibration control apparatus of claim 9 wherein the vibration control operation outputs only the selected one of the first vibration data and the second vibration data and suppresses output of a non-selected one of the first vibration data and the second vibration data.

11. The vibration control apparatus of claim 9 wherein the first vibration data is assigned a first priority level, the second vibration data is assigned a second priority level, and the processor is configured to select between the first vibration data and the second vibration data based on which of the first and second priority levels has a higher priority.

12. The vibration control apparatus of claim 9 wherein the processor is configured to select between the first vibration data and the second vibration data based on which has a higher priority.

13. A vibration control method, comprising:
(a) receiving first vibration data that first software generates;
(b) receiving second vibration data that second software generates;
(c) when the second vibration data is received in the step (b) at the same time that the first vibration data is received in the step (a), selecting between the first vibration data and the second vibration data; and
(d) making a predetermined apparatus or a predetermined terminal connected to the predetermined apparatus vibrate by using the selected one of the first vibration data and the second vibration data and not the other one of the first vibration data and the second vibration data that was not selected.

14. The vibration control method of claim 13 wherein the making (d) outputs only the selected one of the first vibration data and the second vibration data and suppresses output of a non-selected one of the first vibration data and the second vibration data.

15. The vibration control method of claim 13 wherein:
the method further includes assigning the first vibration data a first priority level and assigning the second vibration data is assigned a second priority level; and
the selecting comprises selecting between the first vibration data and the second vibration data based on which of the first and second priority levels has a higher priority.

16. The vibration control method of claim 13 wherein:
the selecting comprises selecting between the first vibration data and the second vibration data based on which has a higher priority.

* * * * *